HETERODYNE ELIMINATOR COMMUNICATION SYSTEM

Filed July 26, 1949 4 Sheets-Sheet 1

Inventor:
James L. A. McLaughlin.
Schroeder, Merriam
By. Hofgren & Brady.
Attorneys.

HETERODYNE ELIMINATOR COMMUNICATION SYSTEM

Filed July 26, 1949 4 Sheets-Sheet 2

Inventor:
James L. A. McLaughlin.
Schroeder, Merriam
By. Hofgren & Brady.
Attorneys.

Inventor:
James L. A. McLaughlin,
Schroeder, Merriam,
Hofgren & Brady.
By. Attorneys.

HETERODYNE ELIMINATOR COMMUNICATION SYSTEM

Filed July 26, 1949 4 Sheets-Sheet 4

Inventor:
James L. A. McLaughlin.
By: Schroeder, Merriam Hofgren & Brady
Attorneys

UNITED STATES PATENT OFFICE 2,535,442

HETERODYNE ELIMINATOR COMMUNICATION SYSTEM

James L. A. McLaughlin, La Jolla, Calif.

Application July 26, 1949, Serial No. 106,943

18 Claims. (Cl. 250—6)

This invention relates to a heterodyne eliminator communication system, and more particularly to such a system having a plurality of receiving signal channels each passing a different group of wave segments spaced from each other in time and each channel passing frequencies comprising only a portion of the intelligence bearing waves.

One feature of the invention is that it provides an improved heterodyne eliminator communication system; another feature of the invention is that it provides means for eliminating an undesired signal closely adjacent a desired signal by providing receiving means wherein the intelligence bearing frequencies received at any given instant comprise a band narrower than the total band of intelligence bearing frequencies; a further feature of the invention is that it provides means for eliminating an undesired signal closely adjacent a desired signal by providing a plurality of signal channels each passing a different group of wave segments spaced from each other in time, and each channel passing frequencies comprising only a portion of the intelligence bearing waves in such segments together with means for providing a combined indication of intelligence borne by the portions passed by each channel; an additional feature of the invention is that it provides apparatus for selectively changing the frequency of the wave segments to change the frequency of the portion of the band passed by each respective signal channel, undesired signals in the nonselected portion being eliminated; still another feature of the invention is that it provides means for eliminating undesired signals lying adjacent the center frequency of the intelligence bearing frequency band; yet a further feature of the invention is that it provides means for cutting off the output of each signal channel when the output of the signal channel is below a predetermined level; still an additional feature of the invention is that it provides means for eliminating undesired signals included in a single sideband transmitted wave; and still a further feature of the invention is that it provides improved means for eliminating undesired signals closely adjacent a desired signal which is in the form of a sequentially modulated wave.

Further features and advantages of the invention will be apparent from the following description and from the drawings, in which:

Figs. 2A and 2B being located in the drawings adjacent the apparatus they illustrate;

Figure 1:
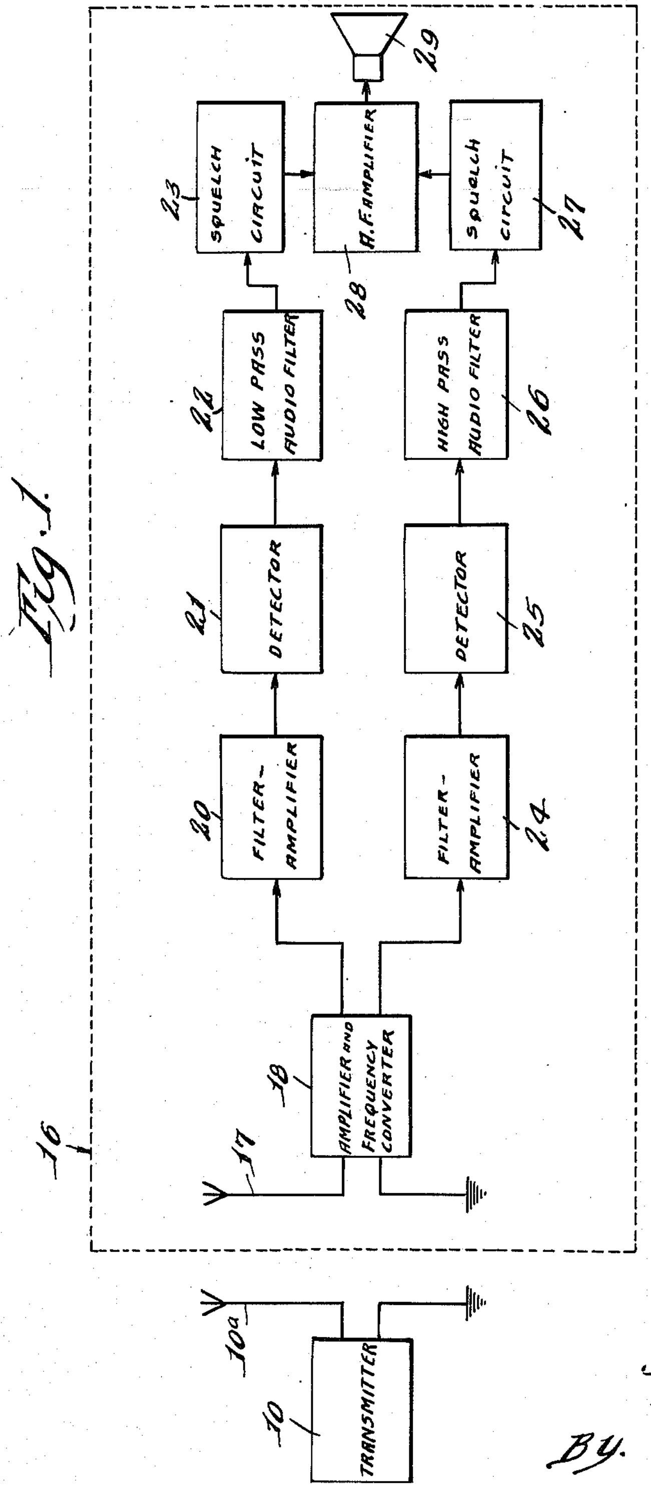
Fig. 1 is a block diagram of one form of the invention.

A radio signal normally comprises one or more bands of intelligence bearing waves, which may be associated with a carrier wave of fixed frequency. The intelligence band results from modulation of the carrier wave with the intelligence frequencies it is desired to transmit; and this modulation may be accomplished by varying the amplitude of the carrier wave at the frequencies of the intelligence to be transmitted, or by varying the frequency or phase of the carrier wave at a rate proportional to the intelligence frequencies to be transmitted. Normally the carrier wave has associated therewith two sidebands, the sideband higher in frequency than the carrier wave being known as a superior or upper sideband, and the sideband of lower frequencies than the carrier wave being known as an inferior or lower sideband. Either sideband bears a full spectrum of intelligence transmitted, and systems have heretofore been devised and are all well known to the art for utilizing only a single sideband.

It has been found that undesired signals of frequencies closely adjacent the frequency of the desired signal which has been transmitted cannot be eliminated merely by making the receiving apparatus more selective. Receiving apparatus can be designed with almost any desired amount of selectivity, but making the circuit too selective results in chopping off the outer edges of the sidebands and thereby losing part of the intelligence. Accordingly, the usual radio receiver is constructed to have a signal channel with a selectivity such that the entire sideband is received where single sideband transmission is contemplated, and such that both upper and lower sidebands are received when double sideband transmission is contemplated.

When an undesired signal carrier wave lies within a sideband the ordinary radio receiver system is unable to eliminate it and it heterodynes with the desired signal carrier to produce an audio wave which substantially or entirely drowns out the desired intelligence. I have heretofore discovered that selection of one or the other sideband may be made at the receiver to eliminate such an undesired wave, the sideband including the undesired wave being suppressed. In my patent entitled, "Heterodyne Eliminator," which issued on December 12, 1944 as No. 2,364,863, I disclosed means for eliminating such an undesired signal by providing two separate waves at opposite sides of the carrier wave of the desired signal, and means for selectively causing one of the other of the waves to heterodyne with the desired signal to select one of the sidebands. In my co-pending application entitled, "Automatic Heterodyne Eliminator," filed August 5, 1946 as Serial No. 688,403, which issued September 6, 1949 as Patent No. 2,480,870, I disclosed means for eliminating an undesired signal by apparatus automatically operable as a function of undesired signal conditions in the sidebands for selecting one of the waves to heterodyne with the desired signal; and in my co-pending application entitled, "Single Sideband Radio Equipment" filed February 28, 1948 as Serial No. 11,925, I disclosed apparatus wherein switching from one sideband to the other is accomplished as a function of the operation of the radio tuning means.

Reference may be had to the above patents for a full disclosure of certain of the apparatus shown in block form in this application, and while manual switching is shown in this application it will be understood that automatic switching means as disclosed in the above Patent No. 2,480,870 or application No. 11,925 may be employed if desired.

The above mentioned patent and co-pending applications depend for their operation upon existence of two sidebands positioned on either side of a carrier wave. Recently, work has been done in developing radio apparatus wherein the band width is narrower than the spectrum of intelligence to be transmitted. For example, certain systems have been developed utilizing a pulse-time or sequence modulated wave wherein a plurality of messages or other intelligence share the time on a single frequency or a band of frequencies. Such systems reduce the likelihood of the occurrence of an undesired signal closely adjacent the desired signal because the frequencies utilized are less than the actual intelligence band. However, reducing the band width of the transmitted signal will not of itself necessarily reduce interference from undesired signals. As pointed out above it reduces the probability that the undesired signal will be present, but should an undesired signal lie within the band width that is actually transmitted, there has been no simple way of eliminating the undesired signal. In other words, greater signal separating ability (actual selectivity) can be had from a communication system wherein the band width transmitted is greater than that of the intelligence spectrum than can be had from a system in which the band width is equal to or less than the spectrum of intelligence frequencies. That the reduction of band width alone will not provide the elimination of undesired signals may be seen from a consideration of radio telegraphy or C. W. telegraphy which provides a system of communication utilizing only a single frequency instead of a band of frequencies. With this system many messages may be transmitted by time sharing means using only a single frequency. However, it has been found that serious heterodyne interference is present in most C. W. bands due to the existence of undesired signals of the same frequency or very close in frequency to the transmitted signal.

The present invention provides a means whereby an undesired signal may be eliminated from a single sideband transmitted wave, and sequence modulation, or time sharing, may be utilized in the system if desired.

Figure 4:
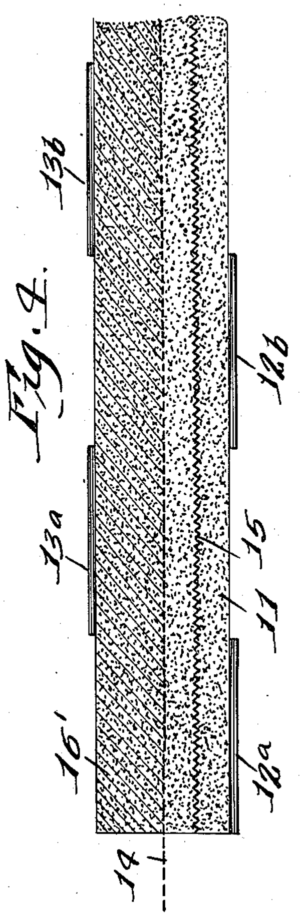
Fig. 4 is a diagrammatic showing of the transmitted wave of the apparatus of Fig. 1.

Referring now more particularly to the drawings, in Figure 1 a transmitter 10 provides a wave shown diagrammatically in Figure 4. This wave comprises a single band of waves bearing intelligence to be communicated and a plurality of carrier waves provided in alternating sequence respectively at opposite sides of the band to provide a plurality of groups of segments, the segments of each group recurring cyclically in timed sequence. Such a transmitter may be similar to the "LE" system described in the article by F. A. Polkinghorn entitled "Commercial Single Sideband Radiotelephone Systems," published in the December 1948 issue of "Communication."

A more complete description of a transmitter of this type may be found in an article by A. A. Oswald entitled "A Short-Wave Single-Sideband Radiotelephone System," appearing in the December 1938 issue of "Proceedings of the Institute of Radio Engineers."

In Figure 4 the band of waves bearing intelligence to be communicated is shown at 11, the entire band being stippled in the drawing. Carrier waves are provided in alternating sequence respectively adjacent the upper and lower edges of the band to provide first and second groups of segments. The carrier waves 12a and 12b adjacent the lower edges of the band provide a first group of segments recurring alternately and cyclically in timed sequence, each segment including the carrier and the sideband associated with the carrier, in this case being a superior side band. Carrier waves 13a and 13b are exemplary of a second group of segments including the carrier 13 and its inferior sideband.

While the frequencies utilized in the apparatus are not critical, but on the contrary are subject to conversion to different frequencies in portions of the radio receiver comprising a portion of the apparatus, it will herein be assumed that the sideband 11 comprises a band of waves bearing intelligence to be communicated and having a width of 4,000 cycles. For example, the carrier 12 may have a frequency of 998 kc. and the carrier 13 may have a frequency of 1002 kc., so that the desired signal is symmetrically disposed about a center frequency of 1000 kc., which center frequency is designated by the broken line 14. In Figure 4 an undesired carrier wave 15 is shown as being contained within the sideband, this undesired wave being assumed to have a frequency of 999 kc. so that it is spaced 1,000 cycles from the carrier 12 and 3,000 cycles from the carrier 13.

The desired signal is transmitted from an antenna 10a of the transmitter 10, and may be received by a receiver designated generally at 16 comprising an antenna 17 coupled to an amplifier and frequency converter section 18. The amplifier and frequency converter section may comprise the first stages of a conventional superheterodyne receiver, including one or more stages of radio frequency amplification, a local oscillator and mixer for converting the transmitted frequency of the desired signal to a lower frequency of the desired signal commonly known as an intermediate frequency, and may include one or more stages of intermediate frequency amplification. The amplifier and frequency converter output is coupled to a first signal channel including a first filter-amplifier 20 coupled to a detector 21 for demodulating the received carrier. An audio filter 22 is coupled to the detector, and a squelch circuit 23 is coupled to the output of the audio filter. A portion of the output of the amplifier and frequency converter 18 is passed through a second signal channel including a second filter-amplifier 24, a second demodulator or detector 25, an audio filter 26 and a squelch circuit 27. Both squelch circuits 23 and 27 are coupled to an audio frequency amplifier 28, which in turn is coupled to a speaker 29.

Figures 2, 2A, 2B, 2C, 2D:
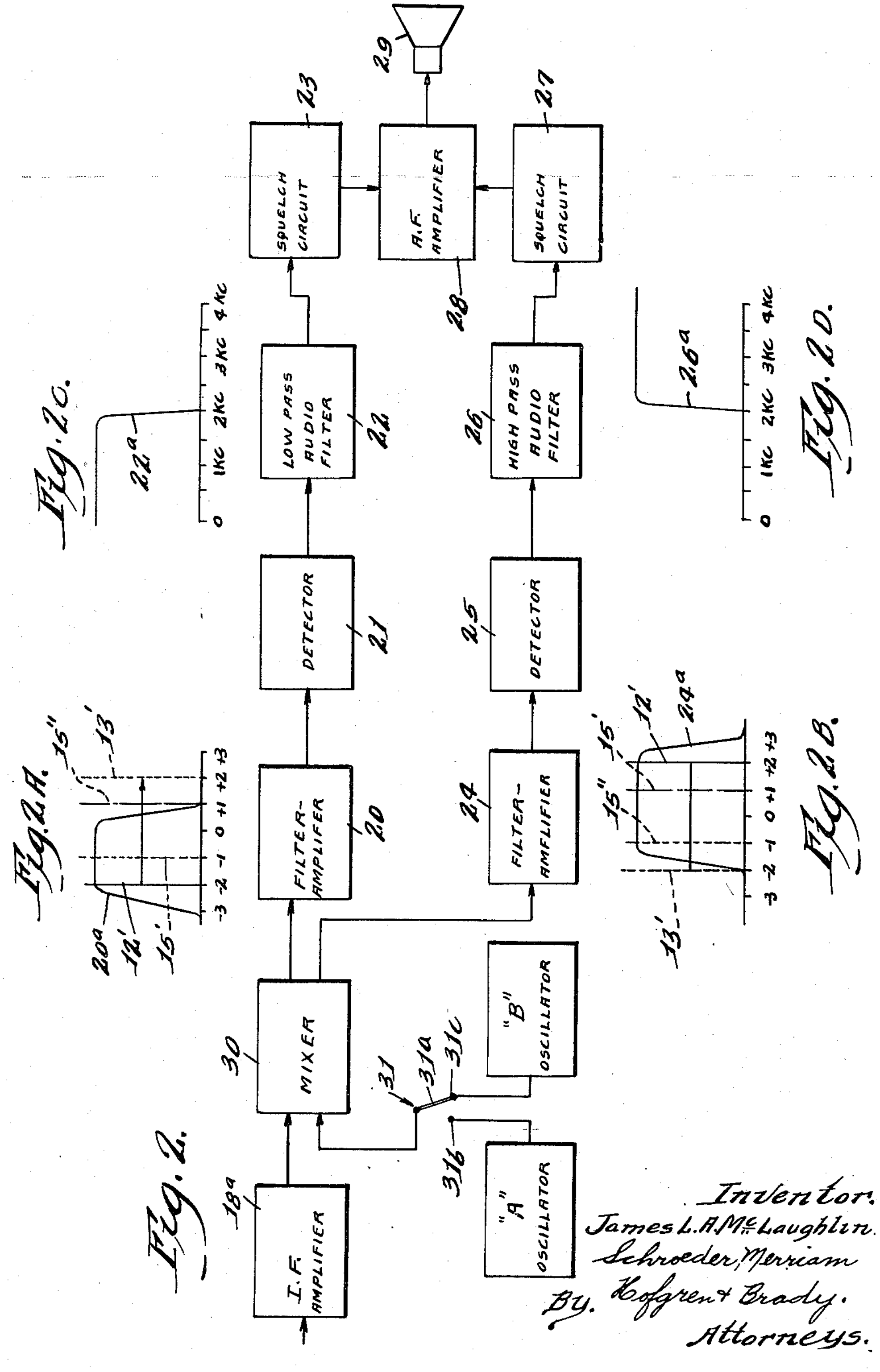
Fig. 2 is a more detailed block diagram of a portion of the apparatus of Fig. 1.
Figs. 2A and 2B are frequency response graphs of portions of the apparatus shown in Fig. 2.
Figs. 2C and 2D are frequency response graphs of other portions of the apparatus of Fig. 2, Figs. 2C and 2D being located adjacent the apparatus they illustrate.

Figure 2 shows a portion of the receiver in greater detail and will be used to illustrate the operation of the system. The last stage of intermediate frequency amplification is shown at 18a, this stage comprising a portion of the amplifier and frequency converter 18. The intermediate frequency amplifier 18a is shown in Figure 2 as being coupled to a mixer stage 30, rather than as being coupled in conventional fashion directly to the filter-amplifiers 20 and 24, the input of the mixer being also connected to the movable terminal 31a of a switch designated generally at 31. One of the stationary terminals 31b of this switch is connected to an oscillator "A" and the other stationary terminal 31c of the switch is connected to another oscillator "B." These oscillators are similar to those shown in my Patent No. 2,364,863 above referred to and in my co-pending application Serial No. 688 403 above referred to, and reference may be had to said patent and application for a complete disclosure thereof. The intermediate frequency amplifier 18a and mixer 30 are of conventional construction well known to the art and will not be described in detail here.

The filter-amplifiers 20 and 24 are conventional intermediate frequency amplifiers having selectivity response curves as shown respectively in Figures 2A and 2B and will not be described in detail. Similarly the detectors 21 and 25 are conventional; the filters 22 and 26 are conventional audio-frequency filters having response curves as shown in Figures 2C and 2D; and the audio-frequency amplifier 28 and the speaker 29 are of conventional construction. For a disclosure of the squelch circuits 23 and 27, reference may be had to pages 185 and 186 of "The Electronic Engineering Handbook" by Batcher and Moulic.

The receiver illustrated may be assumed to operate with an intermediate frequency of 500 kc. although this frequency again is merely exemplary and is not critical. It is assumed that the signal of Figure 4 has been converted in the earlier stages of the receiver so that in Figure 2 the desired signal (the band 11 of Fig. 4) has a center frequency of 500 kc. Oscillator "A" may have a frequency of 600 kc. (being a frequency equal to the mean frequency of the desired signal plus 100 kc.) and oscillator "B" may have a frequency of 400 kc. (being a frequency equal to the mean frequency of the desired signal minus 100 kc.) and one or the other of these oscillators is always connected to the input of the mixer 30 so that the oscillator wave heterodynes with the desired signal from the amplifier 18a to provide a converted desired signal having a mean frequency of 100 kc. This converted desired signal is effectively split in half at the mean frequency and each half (or at least a portion thereof) is passed through a different one of the two signal channels so that the carrier 12 and its side-band are demodulated in one channel and the carrier 13 and its sideband are demodulated in the other channel. It should be noted that when the sideband is split into two portions centered at the mean frequency, only one-half of the sideband contains a full spectrum of information. Referring for a moment to Figure 4, the upper half (in the drawing) of the sideband segments associated with the carrier segments 12 bears information frequencies from 2,000 cycles to 4,000 cycles. Similarly the upper half of the sideband segments associated with the carrier segments 13 bears intelligence frequencies from 0 to 2,000 cycles. Inasmuch as the carrier is cyclically shifted in frequency between the lower and upper edges of the sideband it will be seen that only half of the sideband (as shown by the shaded area 16' of Figure 4) contains a full spectrum of intelligence from 0 to 4,000 cycles, each half of this spectrum sharing the band in time with the other half of the spectrum.

Assuming that oscillator "B" is coupled to the mixer 30 as shown, carrier 12 will be heterodyned from its I. F. frequency of 498 kc. to a frequency of 98 kc. and carrier 13 will be heterodyned from its intermediate frequency of 502 kc. to a converted frequency of 102 kc. However, the undesired signal 15 will be converted from its I. F. frequency of 499 kc. to a converted frequency of 99 kc. These relationships are shown in Figure 2A, wherein the frequency response or acceptance pattern of the filter-amplifier 20 is shown by the curve 20a and wherein the converted center frequency (100 kc. in the example given) is indicated on the graph at zero. On the graph of Figure 2A the converted carrier is shown at 12' as having a frequency of 0 minus 2 (100 kc. minus 2 kc.), this converted carrier being within the band pass of the filter amplifier 20. The other converted carrier is suppressed, this converted carrier being shown at 13' in broken lines as being outside the band pass of the filter-amplifier. However, the converted undesired signal 15' being only one kilocycle below the center frequency, is also within the band pass of the filter-amplifier.

The received desired signal is demodulated in the detector 21 in conventional manner, and after demodulation the audio or intelligence bearing waves are coupled into the filter 22. As indicated in Figure 2, this filter is a low pass filter, having a pass range from zero to 2,000 cycles as indicated graphically in Figure 2C. Thus, in the example given, not only the intelligence bearing waves, but also the undesired signal 15' would pass through the audio filter, and the heterodyning of this undesired signal with the converted desired signal 12' would produce an undesired beat note of 1,000 cycles which would pass through the low pass filter and through the squelch circuit and the audio frequency amplifier and would produce a 1000 cycle tone in the speaker 29.

In order to avoid this undesirable action the frequency of the segments received is inverted to invert the frequency of a portion of the band passed by the signal channel so that the undesired signal is eliminated. This is accomplished by moving the switch member 31a to the position other than that shown where it connects the "A" oscillator with the mixer 30. Now the carrier 12 is converted from its intermediate frequency of 498 kc. to a frequency of 102 kc.; the carrier 13 is converted from its intermediate frequency of 502 kc. to a frequency of 98 kc.; and the undesired signal is converted from its intermediate frequency of 499 kc. to a frequency of 101 kc. In Figure 2A the desired signal carriers 12′ and 13′ now would be transposed from the position shown, the carrier 13′ now appearing 2 kc. below the center frequency and within the band pass of the filter-amplifier, and the carrier 12′ now appearing 2 kc. above the center frequency and outside the pass range of the filter-amplifier so that the carrier 12′ now is suppressed. The converted undesired signal is shown at 15″ as having a frequency 1 kc. above the center frequency and as being outside the pass range of the filter amplifier 20.

With the "A" oscillator switched in the received carrier 13′ would be demodulated in detector 21 in conventional manner, and the audio intelligence bearing waves coupled to the audio low pass filter 22 so that only those audio frequencies in the range from 0 to approximately 2 kc. would pass through the audio filter. While the converted undesired signal 15″ is outside the pass range of the filter-amplifier 20 and is eliminated by such amplifier in the example given, if this converted undesired signal were closer to the center frequency, as for example if the converted undesired signal had a frequency of 100.2 kc., the undesired signal still would be eliminated by the low pass filter. In this event the converted undesired signal would heterodyne with the desired signal 13′ to produce a beat note of 2200 cycles and would be outside the pass range of the audio filter 22. As appears from the above discussion the shaded portion 18 of only the segments associated with and including the carrier wave 13 (in Fig. 4) passes through the signal channel comprising the elements 20, 21, 22 and 23, and are fed from this signal channel to the audio frequency amplifier 28 and speaker 29.

The other group of segments, comprising those segments of the frequency band associated with and including the carrier 12 pass through the signal channel comprising the elements 24, 25, 26 and 27 and are fed to the amplifier 28 and speaker 29. With the "A" oscillator connected to the mixer as above described in order to eliminate the undesired signal, the carrier 12 will be converted from its intermediate frequency of 498 kc. to a frequency of 102 kc.; the carrier 13 will be converted from its intermediate frequency of 502 kc. to a frequency of 98 kc.; and the undesired signal will be converted from its intermediate frequency of 499 kc. to a frequency of 101 kc. Referring to Figure 2B the frequency response curve of the filter-amplifier 24 is designated at 24a, this amplifier having a band pass from about 2 kc. below the center frequency of 100 kc. to a frequency of about 3 kc. above said center frequency. 13′ designates the converted carrier 13, and this carrier is outside the pass range of the filter-amplifier 24 and is suppressed. 12′ designates the converted carrier 12, and this carrier is within the pass range of the amplifier and is received by the amplifier. 15′ designates the converted undesired signal which is also within the pass range of the amplifier. 15″ shows the frequency position which the undesired signal would occupy if "B" oscillator were connected to the mixer.

The received carrier 12′ is demodulated in the conventional manner in the detector 25, this carrier of 102 kc. heterodyning with the undesired wave 15′ to produce a beat note of 1,000 cycles However, this beat note is eliminated in the high pass audio filter 26 the frequency response curve of which is shown at 26a in Fig. 2D. Since the filter 26 passes a band from 2 kc. to 4 kc. the shaded portion 16 (Fig. 4) of the group of segments associated with the carrier 12 will pass through this filter, this being the same portion of the sideband as was passed through the filter 22.

The audio-frequency amplifier 28 is coupled to both signal channels to provide a combined indication of intelligence borne by the frequency band 11.

If each signal channel passed exactly half of the frequency band 11, it would be impossible to eliminate an undesired carrier lying closely adjacent the center of the band. For this reason the filters 22 and 26 are arranged to pass slightly less than half of the band as shown by the sloping response curves in Figs. 2C and 2D and as shown more clearly in Fig. 3 which is a combination of Figs. 2C and 2D. The filters preferably are arranged to have an attenuation of twenty decibels at the center frequency and to have an attenuation of sixty decibels at frequencies slightly beyond the center. The sloping response curve of the filters results in attenuating a small band of frequencies (preferably approximately 200 cycles) near the center of the band. This arrangement will attenuate any undesired signal lying near the center of the band and will also attenuate voice frequencies or other intelligence frequencies lying between about 1900 cycles and 2100 cycles. The attenuation of these voice frequencies does not seriously distort the received signal.

The squelch circuits 23 and 27, one of which is in each signal channel, are desirable to obtain a high signal to noise ratio. When the signal output of the filter in each channel falls below a predetermined useful level the squelch circuit cuts off the output. Without these squelch circuits noise would always come through each of the signal channels despite the fact that each channel is alternately operable in time insofar as the desired signal is concerned. With the squelch circuit, when the upper signal channel in Fig. 2 is receiving a segment in the group including the carrier 13 for example, the lower signal channel is completely cut off and has no output; and similarly when the lower signal channel is receiving a segment in the group of segments including a carrier, the upper signal channel is completely cut off. The squelch circuits provide the added advantage that should the amplitude of the signal passing through the filters fall below a useful level, the squelch circuits will cut off the output of the signal channel. For example, during the time intervals when the group of segments including the carrier 12 is transmitted it is quite possible that no intelligence lying in the frequency band from 2,000 to 4,000 cycles is being transmitted. In this event only noise would come through the lower signal channel. However, the squelch circuit cuts off any output from the lower signal channel under such conditions, thereby increasing the signal-to-noise ratio over that of conventional modulation systems.

Figs. 5–9 illustrate a modified embodiment of the invention wherein a band of intelligence frequencies 4 kc. wide is received while utilizing a band only 1 kc. wide at any given instant.

Figure 9:
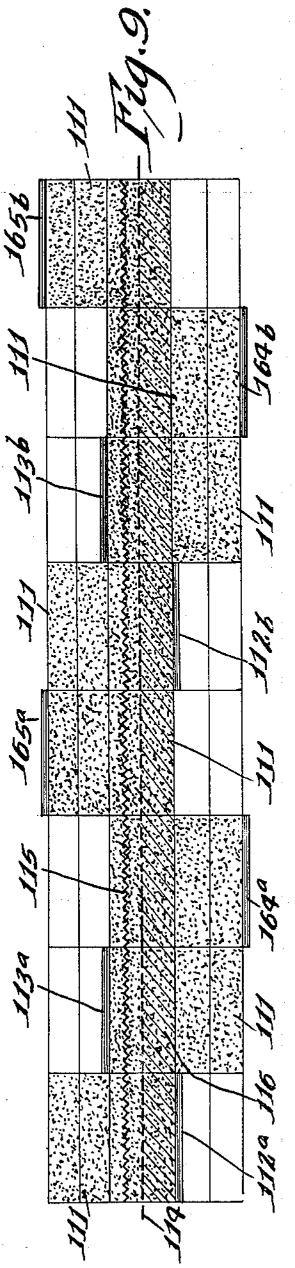
Fig. 9 is a diagrammatic showing of the transmitted wave for the apparatus of Fig. 5.

A transmitter (not shown but similar in principle to the transmitter 10 of Fig. 1) transmits a wave shown diagrammatically in Fig. 9. This wave comprises a frequency band of waves bearing intelligence to be communicated and a plurality of carrier waves provided in alternating sequence respectively on opposite sides of the center of the band to provide a plurality of groups of segments, the segments of each group recurring cyclically in timed sequence, there being as many groups as there are different carriers, and each segment including intelligence bearing waves. In Fig. 9 the intelligence band is indicated at 111 (being stippled) and comprises a band of frequencies 4 kc. in width at any given instant. One segment comprises a carrier 112*a* and the intelligence bearing frequencies of the band during the time the carrier 112*a* is on. Another segment of the same group includes a carrier 112*b* and intelligence frequencies associated therewith; a second group of segments includes carrier segments 113*a*, 113*b*, etc. and associated intelligence frequencies; a third group of segments includes carrier segments 164*a*, 164*b*, etc. and associated intelligence frequencies; and a fourth group of segments includes carrier segments 165*a*, 165*b*, etc. and associated intelligence frequencies. The mean or center frequency is shown at 114 and an undesired signal (assumed to lie one half kc. above the center frequency) is shown at 115. The shaded portion 116 of the band is that portion utilized at the receiver as will appear.

As illustrated the band is 4 kc. wide at any given instant, but a total band width of 6 kc. is transmitted in order to space the carriers in alternating sequence at opposite sides of the center of the band. For example, the carrier 112 may have a frequency of 999 kc. and have associated therewith a superior sideband of intelligence bearing frequencies extending between 999 kc. and 1003 kc. Carrier 113 may have a frequency of 1001 kc. (being located on the opposite side of the center of the band from the carrier 112) and have associated therewith an inferior sideband of intelligence bearing frequencies extending between 1001 kc. and 997 kc.; the carrier 164 may have a frequency of 997 kc. and have associated therewith a superior sideband of intelligence bearing frequencies extending between 997 kc. and 1001 kc.: and the carrier 165 may have a frequency of 1003 kc. and have associated therewith an inferior sideband extending between 1003 kc. and 999 kc. While the transmitted wave as illustrated occupies a total band of 6 kc. with 4 kc. within this band being transmitted at any given instant, if desired the total width of the transmitted band can be cut down to one (1) kc. by a switch or frequency inverting device in the transmitter so arranged that instead of transmitting a continuous spectrum of the entire band of intelligence frequencies (4 kc.) only a portion (as for example one-fourth) of the intelligence bearing waves may be transmitted at any given time and the frequency of the carrier and of the intelligence or modulation waves may be simultaneously switched to provide a continuous band of 1,000 cycles of constant frequency limits—i. e. between 1,000 kc. and 1001 kc., the carrier which shifts in frequency with each switching operation being suppressed.

Furthermore in the system of Fig. 1–4 and in the system Fig. 5–9, the carrier may be switched alternately on opposite sides of the center of the band in the manner shown in the earlier mentioned publications by F. A. Polkinghorn and A. A. Oswald or if desired the carrier may be switched by utilizing a conventional single sideband transmitter and inverting the carrier and the sideband of intelligence bearing frequencies by means of a frequency inverting arrangement similar to that including the "A" oscillator, the "B" oscillator and switch 31. If either of these switching methods are used the switching frequency must be either above or below the range of the intelligence bearing frequency band. An alternative means of switching at the transmitter is by means of voice or modulation control, as by rectifying the positive peaks of the voice frequencies and using the rectified voltage as a control voltage for causing switching to one carrier position, and similarly rectifying the negative peaks of the voice frequencies and using this voltage to control switching to another carrier position. The advantage of this type of control is that no carrier is on during voice lulls.

Figure 5:
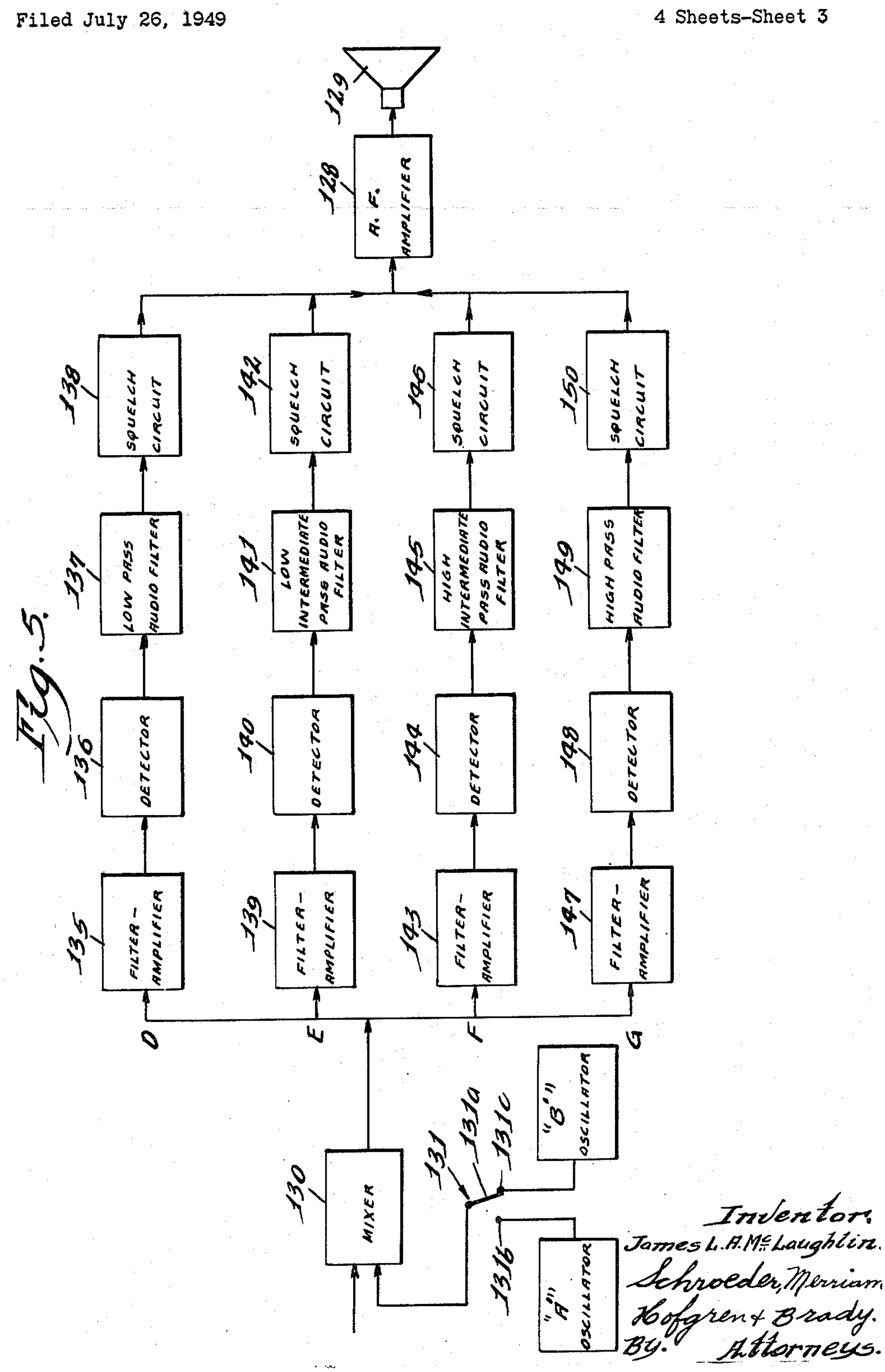
Fig. 5 is a block diagram of a portion of a modified form of the invention.

Referring now to Fig. 5, a portion of the receiver is illustrated. In Fig. 5 a mixer stage 130 has coupled to its input the movable element 131*a* of a switch 131. One stationary contact 131*b* of this switch is coupled to an oscillator designated A′ and the other stationary contact 131*c* is coupled to an oscillator designated B′, this arrangement being similar to that shown in Fig. 2.

A desired signal of the character represented in Fig. 9 is also fed to the input of the mixer, with the mixer being preceded by one or more stages of R. F. amplification, frequency conversion, and intermediate frequency amplification.

In the receiver illustrated means are provided defining a plurality of signal channels equal in number to the number of groups of segments of the transmitted wave, there being four such channels illustrated, and designated respectively as D, E, F, and G. The channel D includes in cascade arrangement a filter-amplifier 135, a detector 136, a low pass audio filter 137 and a squelch circuit 138. Channel E includes a filter-amplifier 139, a detector 140, a low intermediate pass audio filter 141 and a squelch circuit 142. Channel F includes a filter-amplifier 143, a detector 144, a high intermediate pass audio filter 145 and a squelch circuit 146; and channel G includes a filter-amplifier 147, a detector 148, a high pass audio filter 149 and a squelch circuit 150. Each of the filter-amplifiers has its input coupled in parallel to the output of the mixer 130, and each of the squelch circuits has its output coupled in parallel to the input of an audio frequency amplifier 128 which in turn is coupled to a speaker 129.

Figures 6, 7, 8:
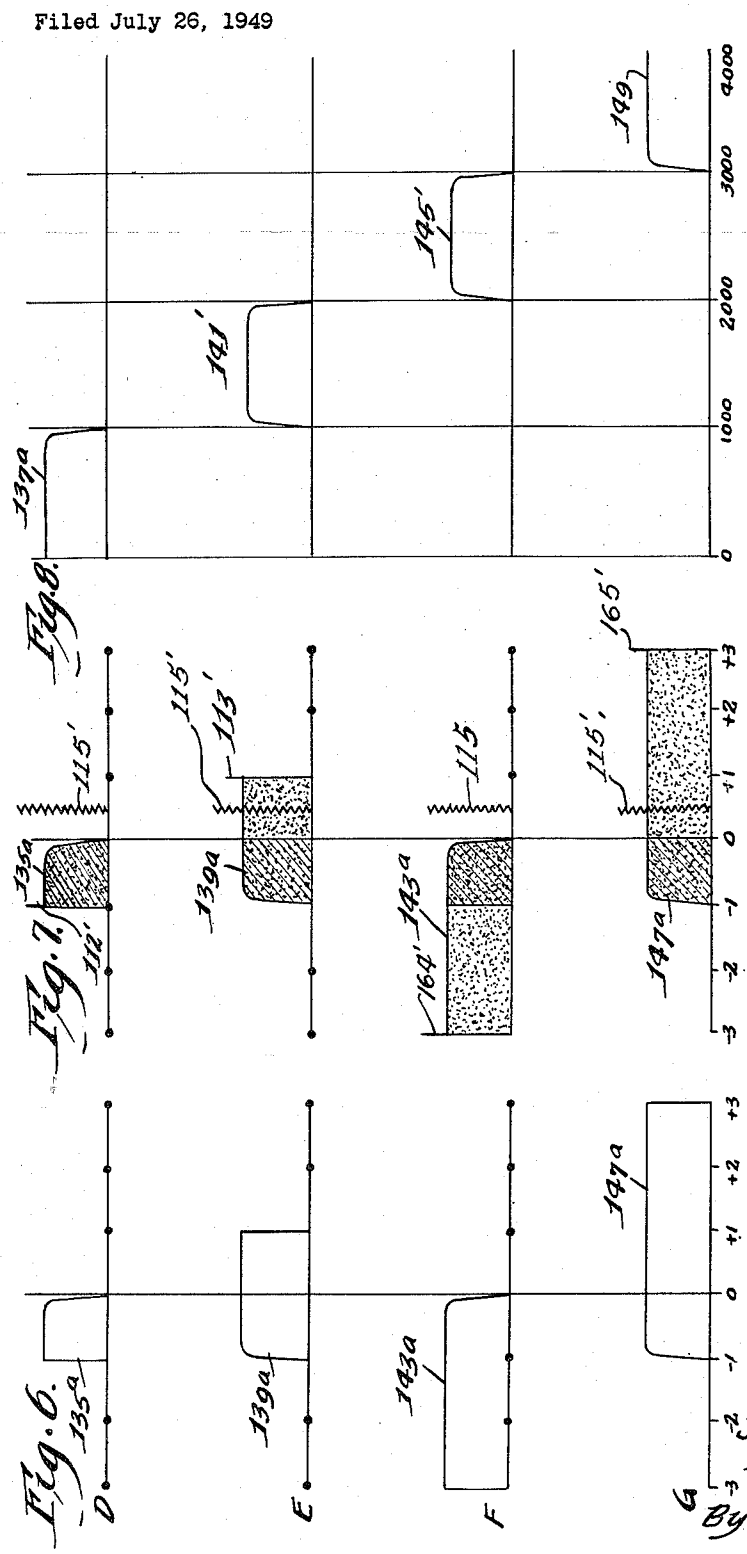
Fig. 6 is a combined frequency response graph of portions of the apparatus of Fig. 5.
Fig. 7 is a graph similar to Figure 6 including a diagrammatic showing of the operation of the apparatus.
Fig. 8 is a combined frequency response graph of another portion of the apparatus of Fig. 5.

Fig. 6 shows the frequency response or selectivity curves of each of the filter-amplifiers. Amplifier 135 in channel D has a frequency response such that it passes only frequencies lying within a band extending from a predetermined center frequency designated "0" in Fig. 6 to 1 kc. below said center frequency, as shown by the curve 135*a* in Fig. 6. Filter-amplifier 139 has a frequency response such that it passes a band 2 kc. in width, one kc. lying on either side of the predetermined center frequency as shown at 139*a*. Filter-amplifier 143 passes a band 3 kc. in width having its upper end at the predetermined frequency as shown at 143a; and filter-amplifier 147 passes a band 4 kc. in width extending upwardly from a frequency 1 kc. below the predetermined center frequency as shown at 147a.

Fig. 7 is a combined view showing the operation of the filter-amplifiers in receiving a signal such as that shown in Fig. 9, the shaded portion being similar to the shaded portion in Fig. 9 and representing the portion of the transmitted band which is ultimately utilized to provide an indication of intelligence which is transmitted. Assuming the center frequency of the mixer 130 to be 500 kc. and the center frequency of the converted desired signal at the mixer output to be 100 kc. as shown in Figs. 6 and 7, "A'" oscillator may have a frequency of 600 kc. and "B'" oscillator may have a frequency of 400 kc. With the "B'" oscillator connected to the mixer as shown in Fig. 5 carrier 112 would be converted from its intermediate frequency of 499 kc. at the input of the mixer 130 to a frequency of 99 kc. as represented in Fig. 7 at 112' the carrier 112 heterodyning with the 400 cycle wave from the "B'" oscillator to provide a wave of 99 kc. shown in Fig. 7 as being 1 kc. below the predetermined center frequency. Because of the selectivity of filter-amplifier 135 only that portion of the band 111 comprising frequencies from 0 to 1 kc. above the carrier 112' would be passed by the filter-amplifier 135, and the undersired signal 115 would be converted in the mixer from a frequency of 500.5 kc. to a converted frequency of 100.5 kc. represented in Fig. 7 at 115' and lying outside the pass range of the filter-amplifier 135. In Fig. 8 the frequency response curve of the low pass audio filter 137 is shown at 137a, this filter passing audio frequencies in the range from 0 to about 1,000 cycles. After demodulation in the detector stage 136 the shaded portion 116 of the band passes through the filter, this shaded portion comprising audio frequencies from 0 to about 1,000 kc. Even if the undesired signal passed through the filter-amplifier 135 it would heterodyne with the carrier 112' to produce a beat note of 1500 cycles and would be eliminated.

Carrier 113 would be converted in the mixer 130 from its I. F. frequency of 501 kc. to a frequency of 101 kc., which is 1 kc. above the predetermined center frequency of 100 kc. This carrier would be passed through channel E as shown, the filter-amplifier 139 passing the converted carrier 113', the converted undesired signal 115' and a band of frequencies extending 2,000 cycles below the frequency of the carrier 113'. However, after demodulation in the detector 140 only those frequencies spaced from 1,000 to 2,000 cycles from the carrier 113' will be passed by the low intermediate pass audio filter 141, the response curve of which is shown at 141' in Fig. 8. Since the undesired signal would heterodyne with the carrier 113' to produce a beat note of 500 cycles, it would be eliminated by the filter 141.

Similarly carrier 164 and a portion of its family of sidebands are passed through signal channel F, the filter-amplifier 143 in this channel accepting the carrier converted to 97 kc. as shown at 164' and that portion of the band 111 lying within 3,000 cycles on the high side of the carrier. Thus, the filter-amplifier eliminates the undesired signal associated with this segment of the band, and, as shown in Fig. 8, the high intermediate pass audio filter 145 passes only those frequencies spaced between 2,000 and 3,000 cycles from the carrier after demodulation. Consequently, even though the filter-amplifier 143 also accepts carrier 112 and the lower 1,000 cycles of its associated side band, this segment is blocked by the audio filter 145. No undesirable heterodyning occurs of course between the segments including the carrier 112 and the segments including the carrier 164 because they are received at different times. Those segments including carrier 165 are passed through signal channel G. Carrier 165 is converted from its I. F. frequency of 503 kc. to a frequency of 103 kc. designated at 165' in Fig. 7, and the entire segment of sidebands is passed by the filter-amplifier 147. However, the undesired signal and all frequencies lying within 3,000 cycles of the carrier are eliminated by the high pass audio filter. The response curve for this audio filter is shown at 149' in Fig. 8, and the filter passes only frequencies lying between 3,000 and 4,000 cycles. Upon detection, the undesired signal heterodynes with the carrier 165' to create a beat note of 2,500 cycles which is blocked by the filter.

Figure 3:
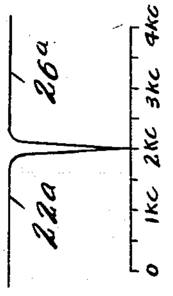
Fig. 3 is a combined graph of Figs. 2C and 2D.

As shown in Fig. 8 the filters attenuate frequencies near the edge of the pass band of the filter so that undesired signals which are closely adjacent the edge of the pass band are attenuated in a manner similar to that described in connection with Fig. 3. Similarly the filter-amplifiers have sloping response curves which attenuate signals near the edge of their pass band farthest from the carrier received by each amplifier, thus effectively eliminating undesired signals very close to the center frequency and preventing unwanted portions of the desired carrier from passing through. For example, referring to Fig. 7, the undesired signal 115' is within the band pass of signal chamber E. If the carrier 112' were also within the band pass of this signal channel the undesired signal 115' would heterodyne with the desired signal carrier 112' in the detector 140 in the signal channel E to provide a beat note of 1500 cycles, and this beat note would pass through the audio filter 141. This undesirable action is prevented by providing a sloping response curve for each of the filter-amplifiers, and in the example given, as may be seen in Fig. 7, the carrier 112' will be attenuated by the filter-amplifier 139 and will be effectively suppressed so that no undesired beat note is provided within the band pass of the filter 141.

The squelch circuits operate in the same manner as described in connection with Fig. 2, and the output of all the channels are connected to the audio-frequency amplifier 128 to provide a combined indication.

In the event an undesired signal lies on the other side of the center frequency, switching to the "A'" oscillator will cause selection of a different portion of the band 111 and will eliminate the undesired signal in the manner shown in my earlier patent and in the application above referred to. In this event of course, the portion 116 of the band which is shaded in Figs. 7 and 9 will no longer be used, but another portion will be selected to provide a combined indication.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Communication apparatus of the character described for eliminating an undesired signal closely adjacent a desired signal, including: means for providing a desired signal comprising a frequency band of waves bearing intelligence to be communicated and a plurality of carrier waves provided in alternating sequence respectively on opposite sides of the center of said band to provide a plurality of groups of segments, the segments of each group recurring cyclically in timed sequence, and each segment including intelligence bearing waves; receiving means including a plurality of signal channels each passing a different group of segments and frequencies comprising only a portion of the intelligence bearing waves in such segments; and means coupled to the output of all of said channels for providing a combined indication of intelligence borne by said portions of the band.

2. Communication apparatus of the character described for eliminating an undesired signal closely adjacent a desired signal, including: means for providing a desired signal comprising a frequency band of waves bearing intelligence to be communicated and a plurality of carrier waves provided in alternating sequence respectively on opposite sides of the center of said band to provide a plurality of groups of segments, the segments of each group recurring cyclically in timed sequence, there being as many groups as there are carriers and each segment including intelligence bearing waves; receiving means including a plurality of signal channels each passing a different group of segments and a different frequency portion of the intelligence bearing waves in such segments; and means coupled to the output of all of said channels for providing a combined indication of intelligence borne by said portions of the band.

3. Apparatus of the character claimed in claim 2, wherein said receiving means include a plurality of filters, each passing frequencies comprising a portion of the intelligence bearing waves in such segments different from, but closely adjacent to, the intelligence bearing waves passed by another of said filters, so that substantially entirely all frequencies of waves bearing intelligence are passed by said signal channels.

4. Apparatus of the character claimed in claim 2, wherein each signal channel includes means for demodulating a portion of the desired signal.

5. Apparatus of the character claimed in claim 2, wherein each signal channel includes electronic means for cutting off its output during the time it is not passing a group of segments and a portion of the intelligence bearing waves in such segments.

6. Apparatus of the character claimed in claim 2, wherein the receiving means includes apparatus for changing the frequency of said segments to change the portion of said band passed by each respective signal channel, together with switch means for selecting a desired portion, undesired signals in the non-selected portion being eliminated.

7. Communication apparatus of the character described for eliminating an undesired signal closely adjacent a desired signal, including: means for providing a desired signal comprising a frequency band of waves bearing intelligence to be communicated and first and second carrier waves provided in alternating sequence respectively adjacent the upper and lower edges of said band to provide first and second groups of segments, the segments of each group recurring alternately and cyclically in timed sequence, and each segment including a carrier and intelligence bearing waves; receiving means including a first signal channel passing only one of said groups of segments and frequencies comprising only a portion of said intelligence bearing waves in such segments, and a second signal channel passing only the other of said groups of segments and frequencies comprising only a portion of said intelligence bearing waves in such segments; and means coupled to the output of all of said channels for providing a combined indication of intelligence borne by said portions of the band.

8. Apparatus of the character claimed in claim 7, wherein said first signal channel passes frequencies comprising substantially half of said intelligence bearing waves, and said second signal channel passes frequencies comprising substantially the other half of said intelligence bearing waves.

9. Apparatus of the character claimed in claim 7, wherein said first signal channel passes frequencies comprising less than half of said intelligence bearing waves and said second signal channel passes frequencies comprising less than the other half of said intelligence bearing waves, undesired signals lying adjacent the center frequency of said band being eliminated.

10. Apparatus of the character claimed in claim 7, wherein the receiving means includes apparatus for inverting the frequency of said segments to invert the portion of said band passed by each respective signal channel, together with switch means for selecting a desired portion, undesired signals in the non-selected portion being eliminated.

11. Communication apparatus of the character described for eliminating an undesired signal closely adjacent a desired signal, including: means for providing a desired signal comprising a frequency band of waves bearing intelligence to be communicated and first and second carrier waves provided in alternating sequence respectively adjacent the upper and lower edges of said band to provide further and second groups of segments, the segments of each group recurring alternately and cyclically in timed sequence, and each segment including a carrier and intelligence bearing waves; means defining a first signal channel, including a first filter-amplifier having a selectivity such that it receives at least a portion of one of said groups of segments, means coupled to said filter-amplifier for demodulating the received carrier and a first filter coupled to the demodulating means, said filter passing frequencies comprising substantially half of said intelligence bearing waves; means defining a second signal channel, including a second filter-amplifier having a selectivity such that it receives at least a portion of the other of said groups of segments, means coupled to said second filter-amplifier for demodulating the received carrier and a second filter coupled to the last mentioned demodulating means, said second filter passing frequencies comprising substantially the other half of said intelligence bearing waves; and means coupled to the output of both of said signal channels for providing a combined indication of intelligence borne by said band.

12. Apparatus of the character claimed in claim 11, wherein the selectivity of each filter-amplifier is such that each filter-amplifier suppresses the carrier of the segment not received, and wherein the means for providing a combined indication comprises an audio-frequency amplifier coupled to the output of both of said filters and having a pass band covering the band of intelligence bearing waves passed by both of said filters.

13. Communication apparatus of the character described for eliminating an undesired signal closely adjacent a desired signal, including: means for providing a desired signal comprising a frequency band of waves bearing intelligence to be communicated and first and second carrier waves provided in alternating sequence respectively adjacent the upper and lower edges of said band to provide first and second groups of segments, the segments of each group recurring alternately and cyclically in timed sequence, and each segment including a carrier and intelligence bearing waves; means for providing two separate heterodyning waves, one having a frequency equal to the means frequency of the desired signal plus a certain frequency and the other having a frequency equal to the mean frequency of the desired signal less said certain frequency whereby heterodyning of said heterodyning waves with the desired signal changes the frequency of the desired signal to the same frequency in both cases while changing that of the undesired signal to different frequencies; means for selecting one of said heterodyning waves to heterodyne with the desired signal; means defining a first signal channel, including a first filter-amplifier having a selectivity such that it receives at least a portion of one of said groups of segments, means coupled to said filter-amplifier for demodulating the received carrier and a first filter coupled to the demodulating means, said filter passing frequencies comprising substantially half of said intelligence bearing wave; means defining a second signal channel, including a second filter-amplifier having a selectivity such that it receives at least a portion of the other of said groups of segments. means coupled to said second filter-amplifier for demodulating the received carrier and a second filter coupled to the last mentioned demodulating means, said second filter passing frequencies comprising substantially the other half of said intelligence bearing waves; and means coupled to the output of both of said signal channels for providing a combined indication of intelligence borne by said band.

14. Communication apparatus of the character described for eliminating an undesired signal closely adjacent a desired signal, including: means for providing a desired signal comprising a frequency band of waves bearing intelligence to be communicated and first and second carrier waves provided in alternating sequence respectively adjacent the upper and lower edges of said band to provide first and second groups of segments, the segments of each group recurring alternately and cyclically in timed sequence, and each segment including a carrier and intelligence bearing waves; means defining a first signal channel, including a first filter-amplifier having a selectivity such that it receives at least a portion of one of said groups of segments and suppresses the carrier of the other group, means coupled to said filter-amplifier for demodulating the received carrier and a first filter coupled to the demodulating means, said filter passing frequencies comprising substantially half of said intelligence bearing waves; means defining a second signal channel, including a second filter-amplifier having a selectivity such that it receives at least a portion of the other of said groups of segments, and suppresses the carrier of the group not received, means coupled to said second filter-amplifier for demodulating the received carrier and a second filter coupled to the last mentioned demodulating means, said second filter passing frequencies comprising substantially the other half of said intelligence bearing waves; means coupled to the respective filter in each signal channel for cutting off the output of the respective channel during the time the channel is not passing a group of segments and a portion of intelligence bearing waves and when the output of intelligence bearing waves is below a predetermined level; and means including an audio-frequency amplifier coupled to the output of both of said channels for providing a combined indication of intelligence borne by said band.

15. Communication apparatus of the character described for eliminating an undesired signal closely adjacent a desired signal, including: means for providing a desired signal comprising a frequency band of waves bearing intelligence to be communicated and first and second carrier waves provided in alternating sequence respectively adjacent the upper and lower edges of said band to provide first and second groups of segments, the segments of each group recurring alternately and cyclically in timed sequence, and each segment including a carrier and intelligence bearing waves; means for providing two separate heterodyning waves, one having a frequency equal to the mean frequency of the desired signal plus a certain frequency and the other having a frequency equal to the mean frequency of the desired signal less said certain frequency, whereby heterodyning of said heterodyning waves with the desired signal changes the frequency of the desired signal to the same frequency in both cases while changing that of the undesired signal to different frequencies; means for selecting one of said heterodyning waves to heterodyne with the desired signal; means defining a first signal channel, including a first filter-amplifier having a selectivity such that it receives at least a portion of one of said groups of segments, and suppresses the carrier of the other group, means coupled to said filter-amplifier for demodulating the received carrier and a first filter coupled to the demodulating means, said filter passing frequencies comprising substantially half of said intelligence bearing waves; means defining a second signal channel, including a second filter-amplifier having a selectivity such that it receives at least a portion of the other of said groups of segments, and suppresses the carrier of the group not received, means coupled to said second filter-amplifier for demodulating the received carrier and a second filter coupled to the last mentioned demodulating means, said second filter passing frequencies comprising substantially the other half of said intelligence bearing waves; means coupled to the respective filter in each signal channel for cutting off the output of the respective channel during the time the channel is not passing a group of segments and a portion of intelligence bearing waves and when the output of intelligence bearing waves is below a predetermined level; and means including an audio-frequency amplifier coupled to the output of both of said channels for providing a combined indication of intelligence borne by said band.

16. Communication apparatus of the character described for eliminating an undesired signal closely adjacent a desired signal, including: means for providing a desired signal comprising a frequency band of waves bearing intelligence to be communicated and a plurality of carrier waves provided in alternating sequence respectively on opposite sides of the center of said band to provide a plurality of groups of segments, the segments of each group recurring cyclically in timed sequence, there being as many groups as there are different carriers, and each segment including a carrier and intelligence bearing waves; means defining a plurality of signal channels equal in number to the number of said groups of segments, each channel including a filter-amplifier having a selectivity such that it receives at least a portion of a different one of said groups of segments, means in each channel coupled to said filter-amplifier for demodulating the received carrier and a filter in each channel coupled to the demodulating means, said filter passing frequencies comprising only a portion of said intelligence bearing waves, the portion of said waves passed by the filter in each channel comprising a fraction of the total intelligence bearing frequencies determined by dividing said total frequencies by the number of channels, and each filter passing frequencies different from, but closely adjacent to the frequencies passed by another of said filter, so that substantially entirely all frequencies of waves bearing intelligence are passed by said signal channels; and means coupled to the output of all of said channels for providing a combined indication of intelligence borne by said portions of the band.

17. Communication apparatus of the character described for eliminating an undesired signal closely adjacent a desired signal, including: means for providing a desired signal comprising a frequency band of waves bearing intelligence to be communicated and a plurality of carrier waves provided in alternating sequence respectively on opposite sides of the center of said band to provide a plurality of groups of segments, the segments of each group recurring cyclically in timed sequence, there being as many groups as there are different carriers, and each segment including a carrier and intelligence bearing waves; means for providing two separate heterodyning waves, one having a frequency equal to the mean frequency of the desired signal plus a certain frequency and the other having a frequency equal to the mean frequency of the desired signal less said certain frequency, whereby heterodyning of said heterodyning waves with the desired signal changes the frequency of the desired signal to the same frequency in both cases while changing that of the undesired signal to different frequencies; means for selecting one of said heterodyning waves to heterodyne with the desired signal; means defining a plurality of signal channels equal in number to the number of said groups of segments, each channel including a filter-amplifier having a selectivity such that it receives at least a portion of a different one of said groups of segments, means in each channel coupled to said filter-amplifier for demodulating the received carrier and a filter in each channel coupled to the demodulating means, said filter passing frequencies comprising only a portion of said intelligence bearing waves, the portion of said waves passed by the filter in each channel comprising a fraction of the total intelligence bearing frequencies determined by dividing said total frequencies by the number of channels, and each filter passing frequencies different from, but closely adjacent to the frequencies passed by another of said filters, so that substantially entirely all frequencies of waves bearing intelligence are passed by said signal channels; and means coupled to the output of all of said channels for providing a combined indication of intelligence borne by said portions of the band.

18. Communication apparatus of the character described for eliminating an undesired signal closely adjacent a desired signal, including: means for providing a desired signal comprising a frequency band of waves bearing intelligence to be communicated and a plurality of carrier waves provided in alternating sequence respectively on opposite sides of the center of said band to provide a plurality of groups of segments, the segments of each group recurring cyclically in timed sequence, there being as many groups as there are different carriers, and each segment including a carrier and intelligence bearing waves; means for providing two separate heterodyning waves, one having a frequency equal to the mean frequency of the desired signal plus a certain frequency and the other having a frequency equal to the mean frequency of the desired signal less said certain frequency, whereby heterodyning of said heterodyning waves with the desired signal changes the frequency of the desired signal to the same frequency in both cases while changing that of the undesired signal to different frequencies; means for selecting one of said heterodyning waves to heterodyne with the desired signal; means defining a plurality of signal channels equal in number to the number of said groups of segments, each channel including a filter-amplifier having a selectivity such that it receives at least a portion of a different one of said groups of segments, means in each channel coupled to said filter-amplifier for demodulating the received carrier and a filter in each channel coupled to the demodulating means, said filter passing frequencies comprising only a portion of said intelligence bearing waves, the portion of said waves passed by the filter in each channel comprising a fraction of the total intelligence bearing frequencies determined by dividing said total frequencies by the number of channels, and each filter passing frequencies different from, but closely adjacent to the frequencies passed by another of said filters, so that substantially entirely all frequencies of waves bearing intelligence are passed by said signal channels; means coupled to the respective filter in each signal channel for cutting off the output of the respective channel during the time the channel is not passing a group of segments and a portion of intelligence bearing waves and when the output of intelligence bearing waves is below a predetermined level; and means including an audio-frequency amplifier coupled to the output of both of said channels for providing a combined indication of intelligence borne by said band.

JAMES L. A. McLAUGHLIN.

REFERENCES CITED

The following references are of record in the file of this patent:

UNITED STATES PATENTS

| Number | Name | Date |
|---|---|---|
| 1,816,953 | Bown | Aug. 4, 1931 |
| 2,179,106 | Taylor | Nov. 7, 1939 |
| 2,364,863 | McLaughlin | Dec. 12, 1944 |
| 2,393,224 | Van Dissel | Jan. 15, 1946 |
| 2,407,260 | Dickieson | Sept. 10, 1946 |
| 2,411,206 | Guanella | Nov. 19, 1946 |
| 2,480,870 | McLaughlin | Sept. 6, 1949 |